United States Patent
Jordan et al.

(10) Patent No.: US 11,248,739 B1
(45) Date of Patent: Feb. 15, 2022

(54) ELONGATED SUPPORT APPARATUS FOR LIFTING AN ITEM TO OR SUPPORTING AN ITEM IN AN ELEVATED CONDITION

(71) Applicants: David S. Jordan, Knoxville, TN (US); Michael C. Jordan, Knoxville, TN (US); Scott M. Jordan, Knoxville, TN (US)

(72) Inventors: David S. Jordan, Knoxville, TN (US); Michael C. Jordan, Knoxville, TN (US); Scott M. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 0 days.

(21) Appl. No.: 16/602,743

(22) Filed: Dec. 2, 2019

(51) Int. Cl.
*F16M 11/28* (2006.01)

(52) U.S. Cl.
CPC ....... *F16M 11/28* (2013.01); *F16M 2200/028* (2013.01)

(58) Field of Classification Search
CPC .. F16M 11/28; F16M 2200/028; F16M 11/26; F16M 11/18; F16M 2200/08; E04H 12/22; E04H 12/2253; E04H 12/2269; E04H 12/2284
See application file for complete search history.

(56) References Cited

U.S. PATENT DOCUMENTS

| | | | | |
|---|---|---|---|---|
| 2,532,168 A | * | 11/1950 | Jakoubek | E21D 15/24 254/101 |
| 2,691,501 A | * | 10/1954 | Spencer | F16M 11/10 248/168 |
| 2,733,030 A | * | 1/1956 | Hawthorne | H01Q 1/1221 248/514 |
| 3,921,952 A | * | 11/1975 | Wirges | A47C 3/30 248/404 |
| 3,930,645 A | * | 1/1976 | Anderson | B25J 1/04 269/289 R |
| 4,415,135 A | * | 11/1983 | French | A47C 3/30 248/161 |
| 4,695,028 A | * | 9/1987 | Hunter | E04F 21/1805 248/354.1 |
| 5,458,306 A | * | 10/1995 | O'Farrill | F16M 11/28 248/188.8 |
| 5,588,630 A | * | 12/1996 | Chen-Chao | F16C 11/10 248/514 |

(Continued)

*Primary Examiner* — Christopher Garft
(74) *Attorney, Agent, or Firm* — Michael E. McKee

(57) ABSTRACT

An apparatus for lifting or supporting an item in an elevated condition includes a telescoping post assembly having an inner tube section which provides one end section of the post assembly and an outer tube section which defines an opposite end section of the post assembly. In addition, a gas spring is mounted within the post assembly for acting between the inner and outer tube sections, and a manually-operable lever member is associated with the gas spring and is cooperable with a fulcrum member to effect the movement of the two opposite end sections of the post assembly away from one another so that by positioning the telescoping post assembly between the support surface and the item to be lifted and then moving the actuator mechanism between two conditions effects the lifting of the item from the support surface.

17 Claims, 11 Drawing Sheets

(56) References Cited

U.S. PATENT DOCUMENTS

| | | | | |
|---|---|---|---|---|
| 6,591,716 | B2 * | 7/2003 | Wantz | B25B 9/00 |
| | | | | 294/210 |
| 8,132,787 | B1 * | 3/2012 | Audet | B66F 3/08 |
| | | | | 254/98 |
| 8,967,555 | B2 * | 3/2015 | Smith | H02G 3/30 |
| | | | | 248/68.1 |
| 2009/0057505 | A1 * | 3/2009 | Chen | F16M 11/28 |
| | | | | 248/185.1 |
| 2015/0308612 | A1 * | 10/2015 | Chen | F16M 11/18 |
| | | | | 248/352 |
| 2017/0016243 | A1 * | 1/2017 | Testa | E04H 12/2292 |
| 2018/0347726 | A1 * | 12/2018 | Anderson | F16L 3/20 |

* cited by examiner

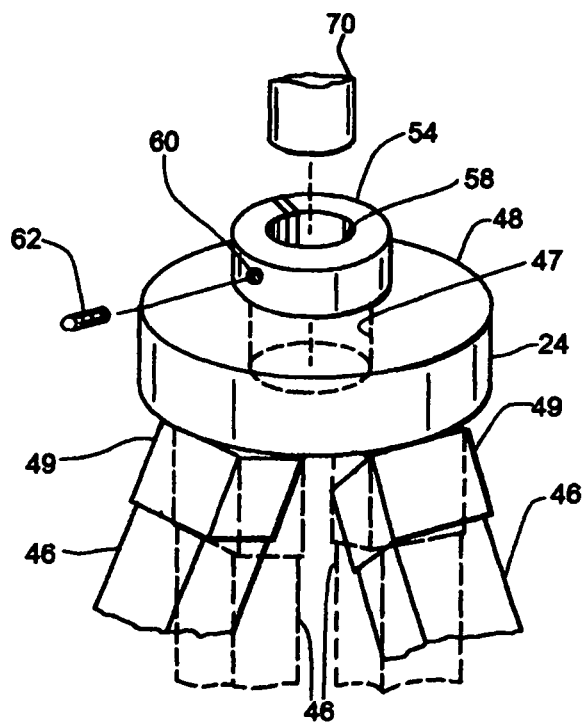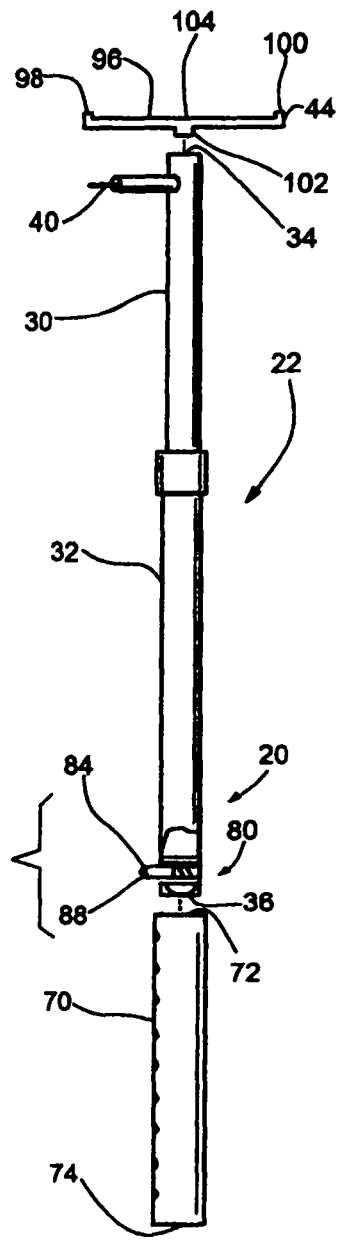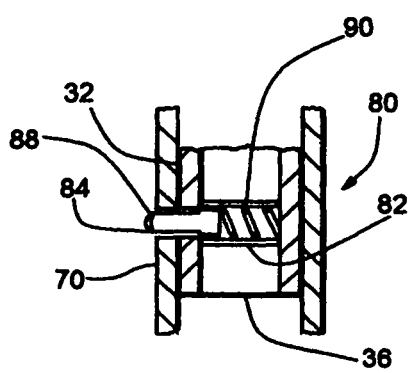
FIG.2
FIG.4
FIG.3

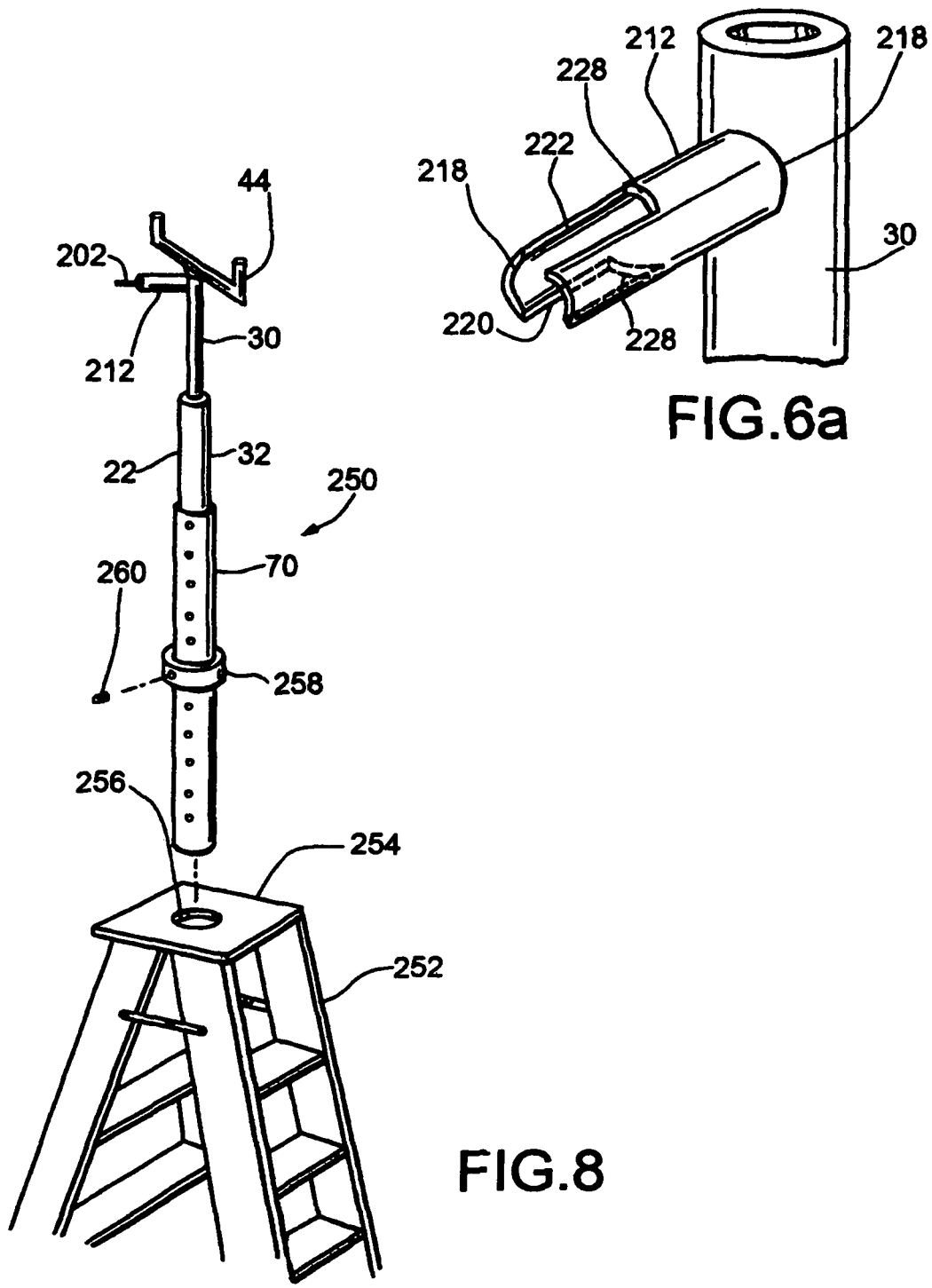

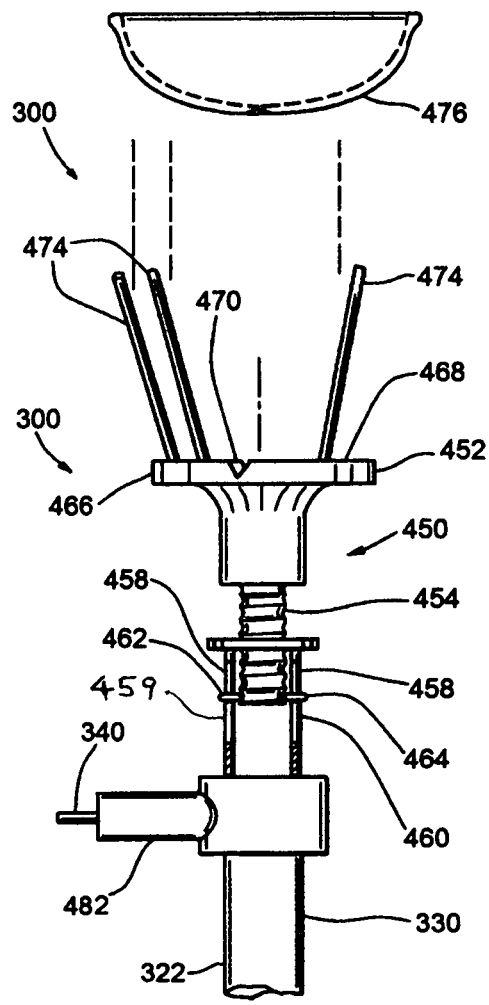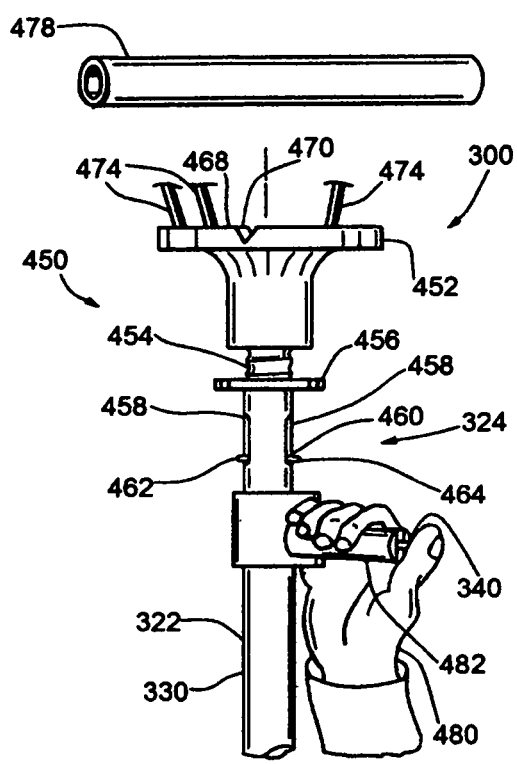
FIG.17
FIG.18

ELONGATED SUPPORT APPARATUS FOR LIFTING AN ITEM TO OR SUPPORTING AN ITEM IN AN ELEVATED CONDITION

BACKGROUND OF THE INVENTION

This invention relates generally to apparatus for lifting and supporting an item and relates, more particularly, to such apparatus which facilitates the lifting and support of an item in an elevated condition above an underlying floor while the item is being worked upon or installed.

The task of working upon or installing an item, such as a light fixture or ceiling ductwork or conduit, in an overhead environment often requires that the item be held in place while it is being worked upon or installed. Of course, the tasks of both holding the item in place and working upon or installing the item are likely to be too difficult for a single person to perform unless he has enough hands to accomplish these tasks simultaneously. Furthermore, the item may have to be held in place for a lengthy period of time while the item is being worked upon or installed, and if such is the case, an individual who must hold the item in place may become unduly fatigued, and the fatigue may be accelerated if the item must be held overhead.

It would therefore be desirable to provide an apparatus which can be utilized by an individual as an aid to both lift an item into an elevated condition overhead and subsequently hold the item in its desired elevated condition while the item is being worked upon or installed.

Accordingly, it is an object of the present invention to provide a new and improved apparatus for lifting an item to an elevated condition or for supporting the item in the elevated condition.

Another object of the present invention is to provide such an apparatus which is capable of holding an item in an elevated condition as the apparatus rests upon an underlying support surface, such as a floor.

Still another object of the present invention is to provide such an apparatus which is elongated in shape and can be used in conjunction with a supplemental support structure, such as a foldable ladder, man lift or scissor lift, for supporting the elongated apparatus in an upright orientation for use.

Yet another object of the present invention is to provide such an apparatus of elongated shape which can be oriented either-end-up for use.

A further object of the present invention is to provide such an apparatus which is relatively light in weight and easy to use.

A still further object of the present invention is to provide such an apparatus having a capacity to lift an item through adjustments in elevation on both a large scale and a smaller scale.

One more object of the present invention is to provide such an apparatus whose stability can be aided and the manipulation of its operational componentry can be effected with a single hand.

Still one more object of the present invention is to provide such an apparatus whose length-adjusting components can be manipulated quickly and with relative ease.

A still further object of the present invention is to provide such an apparatus which is uncomplicated in structure, yet effective in operation.

SUMMARY OF THE INVENTION

This invention resides in an apparatus for lifting or supporting an item in an elevated condition above a floor or underlying support surface.

The apparatus includes an elongated telescoping post assembly defining two opposite end sections and having an inner tube section and an outer tube section wherein the inner tube section provides one end section of the two opposite end sections of the post assembly and the outer tube section provides the other end section of the two opposite end sections of the post assembly. In addition, the apparatus includes motive means for moving the inner and outer tube sections relative to one another to alter the distance between the two opposite end sections of the post assembly, wherein the motive means includes a manually-operable actuator mechanism which is movable between a first condition and a second condition so that movement of the actuator mechanism from the first condition to the second condition effects the movement of the two opposite end sections of the post assembly away from one another and so that by positioning the telescoping post assembly between the support surface and the item to be lifted and then moving the actuator mechanism from the first condition to the second condition effects the lifting of the item from the support surface.

BRIEF DESCRIPTION OF THE DRAWINGS

FIG. 2 is a perspective view of a fragment of the FIG. 1 apparatus, shown exploded.

FIG. 3 is a side elevation view of various componentry of the FIG. 1 apparatus, shown exploded and partially cut-away.

FIG. 4 is a cross-sectional view of a fragment of the apparatus componentry illustrated in FIG. 3.

FIG. 6a is a perspective view of a fragment of the components of the post assembly of the FIG. 1 apparatus.

FIG. 8 is a perspective view of an alternative embodiment of an apparatus shown being supported in a upright condition with a common step ladder.

FIG. 17 is a longitudinal cross-sectional view of the embodiment of FIG. 11 taken about along line 17-17 of FIG. 16 and depicting one form of a load supportable by the FIG. 11 embodiment.

FIG. 18 is a side elevation view of a fragment of the embodiment of FIG. 11 whose actuator mechanism is in a condition to be manipulated with one hand of an operator and depicting another form of a load which is supportable by the FIG. 11 embodiment.

DETAILED DESCRIPTION OF AN ILLUSTRATIVE EMBODIMENT

Figure 1:
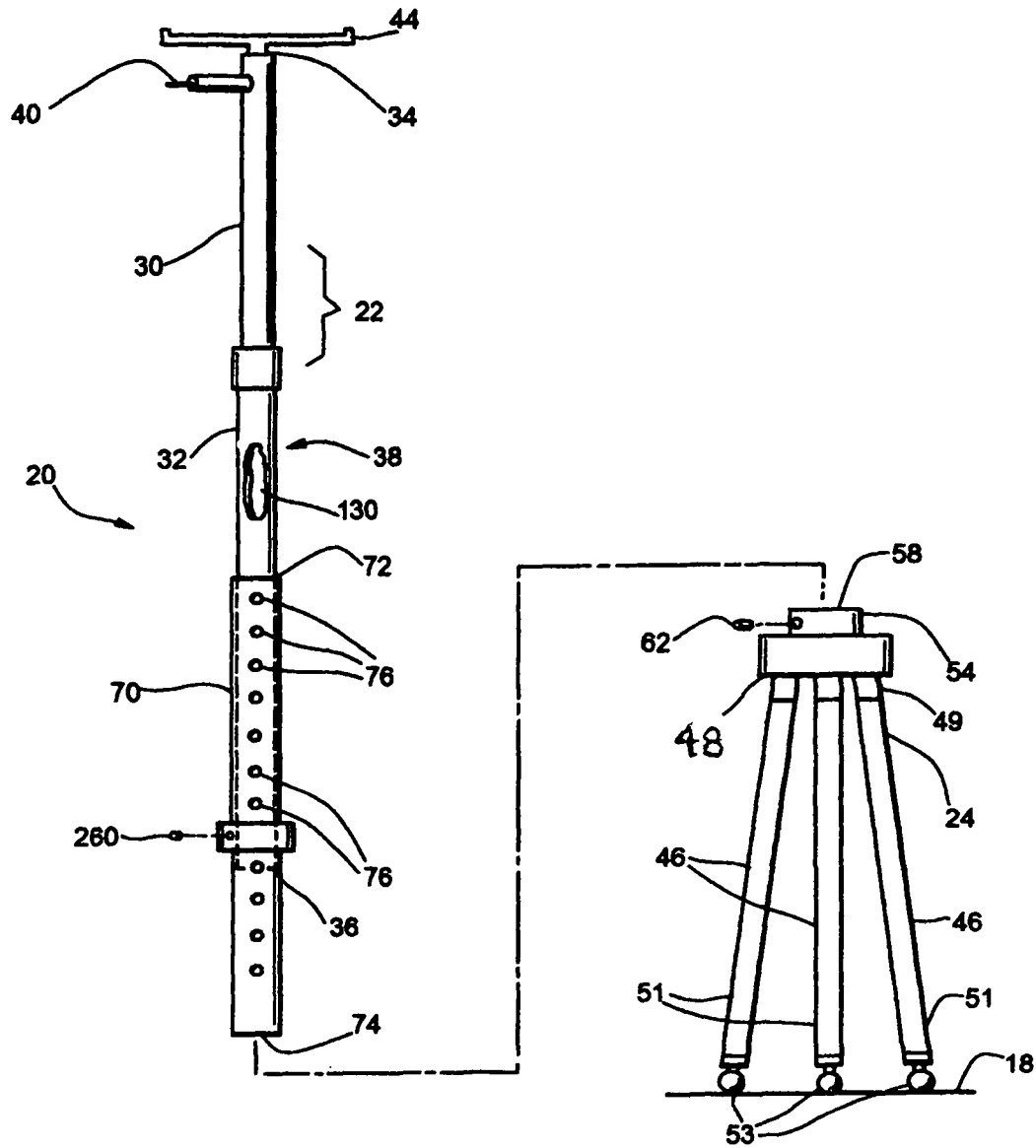
FIG. 1 is a side elevation view of an embodiment of an apparatus within which features of the present invention are incorporated, shown partly cut-away and shown removed from its base.

Turning now to the drawings in greater detail and considering first FIG. 1, there is illustrated an embodiment, generally indicated 20, of an apparatus within which features of the present invention are embodied. In an exemplary environment of intended use of the FIG. 1 apparatus 20, an item 42 (FIG. 7) is desired to be lifted from a lowered condition into an elevated condition and held in its elevated condition while the item 42 is being worked upon or installed. Such an item 42 may be a light fixture, a piece of ductwork or a piece of conduit desired to either be installed adjacent the ceiling 43 of a room or worked upon in its position adjacent the ceiling 43. In either case, the item 42 is desired to be raised to or held in an elevated condition above a support surface, such as an underlying floor 18, and the apparatus 20 is intended to obviate the need for a second individual who may otherwise be required to lift or hold the item 42 in place in the desired elevated condition while the item 42 is either installed or worked upon. Accordingly, the principles of the present invention can be variously applied to alternative items and alternative applications.

Briefly and with reference again to FIG. 1, the apparatus 20 includes an elongated telescoping post assembly, generally indicated 22, and a tripod-style base 24 within which the post assembly 22 is supported in a substantially upright, or vertically-oriented, condition above an underlying surface, such as the floor 18. Embodied within the post assembly 22 is an inner tube section 30 and an outer tube section 32 wherein each tube section 30 or 32 defines a corresponding one of two opposite upper and lower ends 34, 36, respectively, of the post assembly 22 and motive means, generally indicated 38, for acting between the inner and outer tube sections 30, 32 so that the opposite ends 34, 36 of the post assembly 22 are either urged away from one another or are prevented from moving relative to one another. Furthermore, there is associated with the motive means 38 a manually-accessible actuator mechanism 40 which is moveable between multiple positions enabling an operator, or user 26 (FIG. 7), to actuate the motive means 38 and thereby lengthen the post assembly 22. Therefore, by anchoring one, or the lower, end 36, of the post assembly 22 within the base 24, resting the item 42 (FIG. 7) atop the other, or upper, end 34 of the post assembly 22 and then appropriately manipulating the actuator mechanism 40, the item 42 is raised to an elevated condition under the power of the motive means 38 and is subsequently held in the elevated condition by the post assembly 22.

With reference to FIGS. 1-3, each of the inner and outer tube sections 30 or 32 of the post apparatus 22 has a hollow interior and is elongated in shape, and the inner tube section 30 is positioned within the outer tube section 32 to permit movement of the inner tube 30 relative to and along the length of the outer tube section 32 so that the spaced distance between the opposite ends 34, 36 of the post assembly 22 is altered. Consequently and as the post assembly 22 is lengthened, the opposite ends 34, 36 thereof move further apart, and as the post assembly 22 is collapsed, or shortened, the opposite ends 34, 36 thereof move closer together. For a purpose which will be apparent herein, there is associated with the upper end 34 of the post apparatus 22 a support member 44 upon which the item 42 (FIG. 7) is adapted to rest during both an operation involving the lifting of the item 42 to an elevated condition and a period of time during which the item 42 is desired to be held in its elevated condition while the item 42 is being worked upon or installed.

As best shown in FIGS. 1 and 2, the base 24 of the apparatus 20 resembles a tripod having three legs 46 which are each hingedly connected at one end thereof (i.e. the upper end as seen in FIGS. 1 and 2) to a disc-shaped plate 48 having a vertically-disposed opening 47 defined therein. Each of the legs 46 has an upper end 49 which is hingedly joined to the underside of the plate 48 and a lower end 51 which extends downwardly to the underlying floor 18. Because of the hinged connection between the upper ends 49 of the legs 46 and the plate 48, the lower ends 51 of the legs 46 can be pivotally moved relative to the upper plate 48 between a spaced-apart position for use, as depicted in FIG. 1 and in solid lines in FIG. 2, and a collapsed position for storage, as depicted in phantom in FIG. 2. If desired, the lower ends 51 of the legs 46 can be provided with floor-engaging feet 53.

With reference to FIGS. 1-4, there is disposed between the post assembly 22 and the base 24 a hollow extension tube 70 to which the outer tube section 30 of the post assembly 22 is securable. The extension tube 70 has two opposite ends 72 and 74 and a hollow interior which is sized to closely accept the outer tube 32 of the post assembly 22 directed end 36—first therein yet permit the outer tube 32 to be slidably moved, or shifted, axially along the length of the extension tube 70. The extension tube 70 also defines a plurality of radially outwardly-directed openings 76 arranged along a substantially linear path which extends along the length of the tube 70. As will be apparent herein, the openings 76 aid in the securement of the post assembly 22 or, more specifically, the outer tube section 32 at any of a number of alternative positions along the length of the extension tube 70.

For purposes of cooperating in its intended manner with the extension tube 70 and post assembly 22, the disc-shaped plate 48 of the base 24 is provided with a central through-opening 47 (introduced earlier) which opens substantially vertically through the body of the plate 48, and there is positioned upon the plate 48 a collar member 54 having a central opening 58 which is disposed in vertical registry with the through-opening 47 of the disc-shaped plate 48. The collar member 54 also includes a radially-disposed, internally-threaded opening 60 for accepting a set screw 62. By positioning the extension tube 70 through the central opening 58 of the collar member 54 and then tightening the set screw 62 against the outer surface of the tube 70, the extension tube 70 (as well as the post assembly 22 secured within the tube 70 in a manner described herein) can be releasably secured within the base 24 and supported thereby in a substantially vertical orientation.

As mentioned earlier, the extension tube 70 is sized to permit the outer tube section 32 of the post assembly 22 to be slidably positioned along the length of the extension tube 70. For purposes of releasably securing the outer tube section 32, and thus the post assembly 22, at a desired position along the length of the extension tube 70 and with reference to FIGS. 3 and 4, there is associated with the outer tube section 32 securement mechanisms, generally indicated 80 in FIGS. 3 and 4, which are mounted internally of the outer tube section 32 for cooperating with the openings 76 provided along the length of the extension tube 70 in a manner which secures the outer tube section 32 to the extension tube 70. To this end, the securement mechanisms 80 include a sleeve-like member 82 mounted transversely of the outer tube 32 adjacent the end 36 thereof and a retractable pin 84 having a body which is positioned within the sleeve-like member 82 for movement therealong and having an end 88 which is capable of protruding from one side of the outer tube 32. A spring 90 is positioned between the body 86 of the pin 84 and the end of the sleeve-like member opposite the end 88 for biasing the pin end 88 to an extended position at which the pin end 88 protrudes to one side of the outer tube 32.

In order to secure the outer tube 32 at a desired position along the length of the extension tube 70, the pin 84 is moved (e.g. manually) against the biasing force of the spring 90 to a retracted position within the sleeve-like member 82, and then the outer tube section 32 is moved (e.g. manually) along the length of the extension tube 70 to a position at which the pin end 88 becomes aligned with a selected, or desired, opening 76 defined along the length of the tube 70. Once moved into aligned registry with the selected opening 76, the pin end 88 is permitted to move, under the force of the spring 90, to its extended position at which the pin end 88 is accepted by the selected opening 76 and thereby interlocks the extension tube 70 and the outer tube section 32 together. It follows that in order to release the outer tube section 32 from the extension tube 70 for the purpose, for example, of shifting the post assembly 22 to an alternative axial position along the length of the tube 70, the pin end 88 is depressed (e.g. manually) to its retracted position within the sleeve-like member 82, so that the outer tube section 32 can be shifted relative to and along the length of the extension tube 70. It also follows that the series of openings 76 provided along the length of the extension tube 70 provides a user with the option of interlocking the outer tube section 32, and thus the post assembly 22, at any of a number of alternative locations along the length of the extension tube 70.

Figure 7:
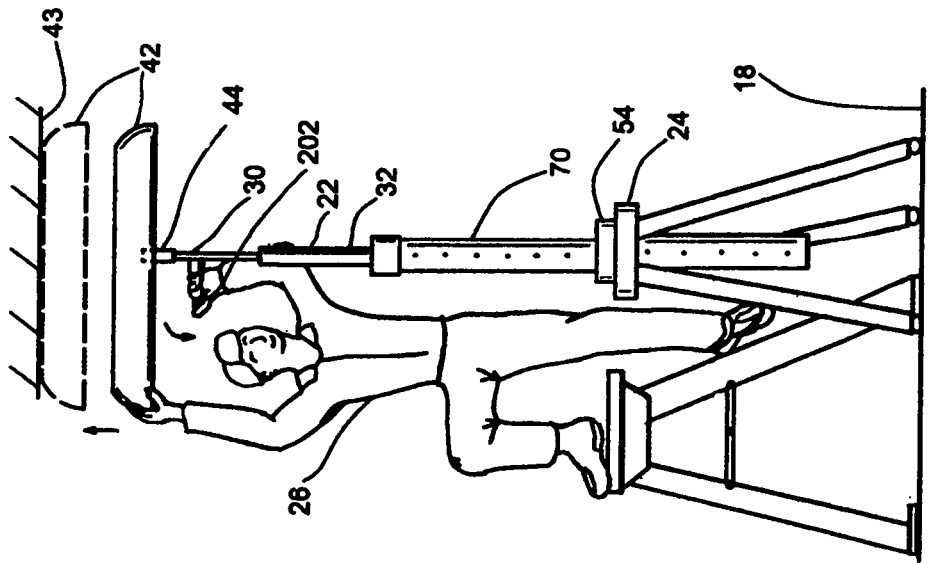
FIG. 7 is a perspective view of the FIG. 1 apparatus shown being utilized in an exemplary environment of use.

With reference to FIGS. 1, 3 and 7, the apparatus 20 also includes a support member 44 connectable to the (upper) end 34 of the post assembly 22 and upon which a desired item (FIG. 7) is intended to rest when the apparatus 20 is used to lift the item 42 to an elevated condition. Within the depicted apparatus 20, the support member 44 includes a bar portion 96 having two upturned end portions 98, 100 and a post portion 102 depending downwardly from the bar portion 96 from a location disposed substantially midway between the upturned end portions 98, 100. The post portion 102 is sized to be slidably accepted by the hollow interior of the inner tube section 30 at the end 34 thereof. With the post portion 102 accepted by, and thus supported within, the open end 34 of the inner tube 30, the bar portion 96 provides a substantially horizontally-disposed support surface 104 upon which an item 42 is permitted to rest during a lifting or holding operation performed with the apparatus 20.

Although the support member 44 of the depicted apparatus 20 has been described as providing a substantially horizontally-disposed support surface 104 (FIG. 3) upon which an item 42 is permitted to rest, the support member 44 can take any of a number of forms or shapes depending upon the shape of the item to be lifted or held. For example, if the item to be lifted or held is a piece of electrical conduit, the support member can be shaped to resemble an upwardly-opening U or V so that the conduit can be held in a stable condition as the conduit rests within the interior of the U or V of the support member 44. Furthermore, the support member 44 can possess a magnet designed to facilitate the holding of an electrically-conductive item, such as electrical cable, atop the apparatus 20.

As mentioned earlier and with reference to FIG. 5, the motive means 38 of the depicted apparatus 20 is adapted to move the opposite ends 34, 36 of the post assembly 22 relative to one another to alter the distance between the opposite ends 34, 36. Although the motive means 38 can take any of a number of forms, the motive means 38 of the depicted apparatus 20 is in the form of a gas spring 130 having opposite ends 132, 134 which are fixedly secured between the inner and outer tube sections 30, 32 and which are capable of moving toward or away from one another between an extended or collapsed condition of the spring 130. It follows that because the opposite ends 132, 134 of the spring 130 are attached to the inner and outer tube sections 30, 32, respectively, the movement of the gas spring 130 between its extended and collapsed condition effects the movement of the inner and outer tube sections 30, 32 between extended and collapsed conditions. Since the post assembly 22 is supported by the extension tube 70 and tripod base 24 in a substantially vertical orientation during use of the apparatus 20, the movement of the post assembly 22 between collapsed and extended conditions effects the raising or lowering of an item 42 positioned upon the support member 44.

Figure 5:
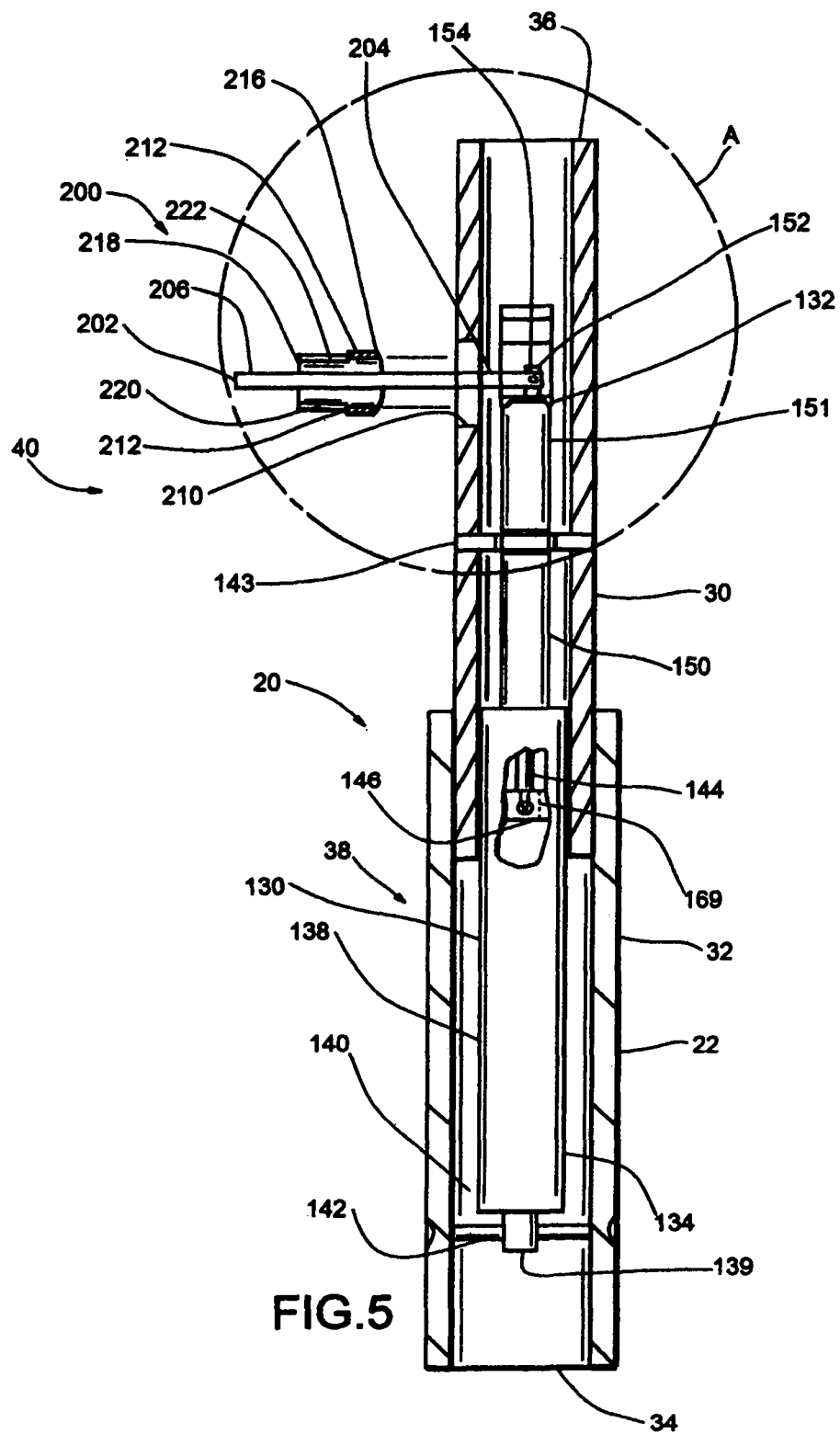
FIG. 5 is a longitudinal cross-sectional view of a fragment of the apparatus componentry depicted in FIG. 3, shown exploded and partially cut-away.

With reference still to FIG. 5, the gas spring 130 includes a hollow, substantially cylindrically-shaped casing 138 having a lower end 140 which is fixedly secured (e.g. pinned) to the outer tube section 32 with a pin 142 which extends transversely through the outer tube section 32 and a boss 139 associated with the lower end 140 of the casing 138. The gas spring 130 also includes a piston assembly 144 having a piston 146 which is slidably positioned within the casing 138 for movement axially therealong and a hollow piston rod 150 which is attached to the piston 146 for movement therewith along the length of the casing 138. The end, indicated 151, of the piston rod 150 which extends from the casing 138 is fixedly secured to the inner tube section 30 with a clamp and pin arrangement 143 joined between the piston rod end 151 and the inner tube section 30. In addition, the piston 146 separates the interior of the casing 138 into two chambers within which a pressurized gas (e.g. nitrogen) is contained, and there is associated with the piston 146 an internal valve, whose schematic representation is designated 169 in FIG. 5, and which, when opened, permits pressurized gas to flow between the two chambers of the casing 138. A tappet rod 152 extends through the center of the piston rod 150 and has a lower end which is connected to the internal valve 169 and an opposite upper end 154 which extends axially from the piston rod 150 for access thereto. As will be apparent herein, the internal valve 169 of the piston 146 is moved between opened and closed conditions as the accessible upper end 154 of the tappet rod 152 is moved upwardly or downwardly by way of the actuator mechanism 40.

The construction and operating principles of a gas spring of the aforedescribed class are well known so that a detailed description of such a spring is not believed to be necessary. Suffice it to say that such springs, including the gas spring 130, rely upon a difference between the surface areas disposed on opposite sides of the piston 146 in order to bias the piston 146 along the length of the casing 138 when the internal valve 169 of the piston 146 is opened. In other words and upon opening the internal valve 169 of the piston 146, the pressurized gas contained within the two chambers of the casing 138 is permitted to flow between the two chambers (in an effort to equalize the internal pressures of the two chambers), but since the area of the piston 146 on the side thereof opposite the piston rod 150 is greater than that of the piston 146 on the side thereof corresponding with the piston rod 150, the piston 146 is naturally biased toward the end of the casing 138 through which the piston rod 150 extends. By comparison and upon closing the internal valve 169 of the piston 146 so that no pressurized gas is permitted to flow between the two chambers of the casing 138, the piston 146 remains in a stationary condition along the length of the casing 138.

It follows that as long as the external forces exerted axially along the gas spring 130 which tend to urge the piston rod 150 further into the casing 138 (i.e. so that spring 130 is further collapsed) do not exceed a threshold value (corresponding to a limit of spring strength), the opening of the internal valve 169 effects the urging of the piston rod 150 axially from the casing 138 (i.e. so as to extend the spring 130). It also follows that by virtue of the connections between the casing 138 and the piston rod 150 to the outer and inner tube sections 32 and 30, respectively, the opening of the internal valve 169 of the piston 146 effects the urging of the inner tube section 30 axially along the length of the outer tube section 32 (i.e. so as to extend the post assembly 22) and thereby lifts an item 42 which is situated upon the support member 44. Because the movement of the piston rod 150 along the casing 138 can be halted upon closing of the internal valve 169 of the piston 146, the extension of the post assembly 22, and thus the raising of the item 42, can be halted by closing the internal valve 169 of the piston 146 when the item 42 reaches its desired elevation. When it is desired that the post assembly 22 is returned to a collapsed condition (e.g. such as upon completion of a job performed with the apparatus 20), the internal valve 169 of the piston 146 is opened and axially-directed forces sufficient to overcome the natural biasing force of the spring 130 are exerted (e.g. manually) upon the inner and outer tube sections 30 and 32 so that the inner tube section 30 moves axially inwardly of the outer tube section 32.

As mentioned earlier, the internal valve 169 of the piston 146 is opened and closed by manipulation (e.g. upward and downward movement) of the tappet rod 152 between upper and lower axial positions along the length of the piston rod 150. More specifically, the tappet rod 152 can be positioned along the length of the piston rod 150 at a first, or medial, position at which the internal valve 169 of the piston 146 is closed and either of two upward or downward (e.g. upper and lower) positions disposed axially of the aforementioned first, or medial, position at which the internal valve 169 of the piston 146 is closed. Moreover, there is associated with the internal valve 169 of the piston 146 a spring-including arrangement (not shown) which biases the internal valve 169 from either its open condition toward its closed condition so that the tappet rod 152 is spring-biased from either of its upward or downward positions toward its first, or medial, position. An example of a gas spring possessing the aforedescribed characteristics is available from Bansbach Easylift of North America, Inc. under the trade designation EASY-LIFT.

Figure 6:
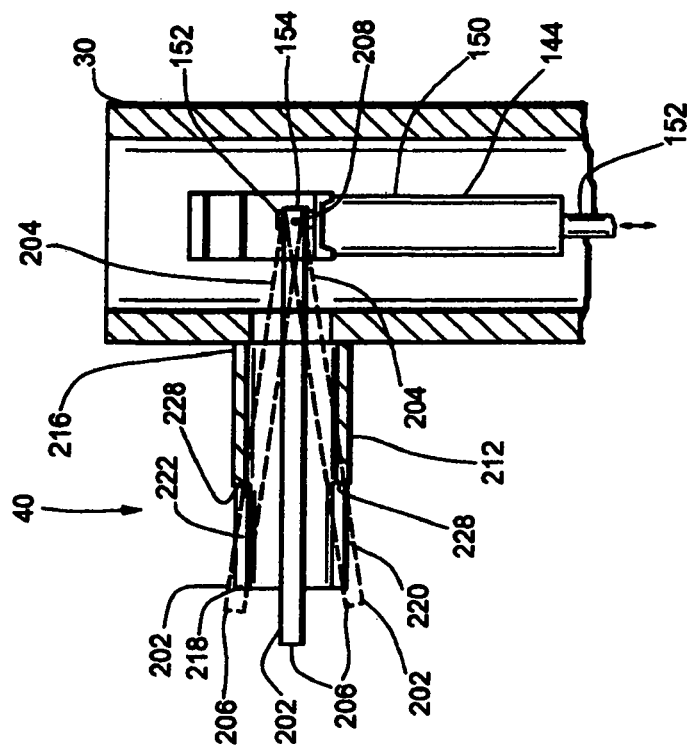
FIG. 6 is a view of a portion of the apparatus fragment depicted within circle A of FIG. 5, but drawn to a slightly larger scale.

With reference to FIGS. 5 and 6, it is a feature of the present invention that the actuator mechanism 40 of the apparatus 20 is connected to the tappet rod 152 for moving the tappet rod 152 between the aforementioned first, or medial, position of the tappet rod 152, and the aforementioned upward or downward positions of the tappet rod 152 for controlling the opening and closing of the internal valve 169 of the piston 146 and thus, the permitted movement of the gas spring 130 between its extended and collapsed conditions.

Within the depicted apparatus 20, the actuator mechanism 40 is in the form of an elongated lever member 202 having two opposite ends 204, 206 wherein one end 204 is pivotally connected, as with a pin 208, to the upper end, as viewed in FIG. 5, of the tappet rod 152 and the other end 206 extends laterally through an opening 210 provided in one side of the inner tube 30. Furthermore, there is secured to the exterior surface of the inner tube section 30 and about the opening 210 a laterally-extending tube member 212 through which the end 206 of the lever member 202 extends. As will be apparent herein, the tube member 212 defines surfaces which provide a fulcrum about which the lever member 212 can be pivoted for the purpose of moving the tappet rod 152 between its first, or medial, position toward its upper or lower positions.

With reference to FIGS. 6 and 6a, the tube member 212 defines two opposite ends 216, 218 wherein one end 216 is fixedly secured (e.g. welded) to the exterior surface of the inner tube section 30 about the opening 210 so that the opposite end 218 of the tube member 212 extends laterally from the inner tube 30. In addition, the tube member 212 has a pair of U-shaped cutouts 220, 222 formed in the opposite sides thereof (i.e. the lower and upper sides as viewed in FIG. 6a) so that the Us of the cutouts 220, 222 open out of the tube member end 218. Moreover, each cutout 220 or 222 includes two opposite side edges and a base edge 228 which extends between the side edges thereof. As best shown in FIG. 6, each base edge 228 is oriented in a radial plane of the tube member 212.

With the tube member 212 joined (e.g. welded) to the upper tube section 30 and the lever member 202 attached (i.e. pinned) to the upper end 154 of the tappet rod 152, the end 206 of the lever member 202 extends, in sequence, through the opening 210 provided in the inner tube section 30, along the length of the tube member 212 and out of the tube member 212 through the end 218 thereof where the lever member 202 is accessible to a user.

When the tappet rod 152 is arranged in its first, or medial, position, the lever member 202 (FIGS. 5 and 6) is disposed in the position depicted in solid lines in FIG. 6 and the internal valve 169 is closed. However when the user desires to open the internal valve 169 and thereby extend the gas spring 130 and post assembly 22, the accessible end 206 of the lever member 202 is moved upwardly or downwardly (as viewed in FIG. 6) at which the lever member 202 is canted with respect to the FIG. 6 solid-line position to either of the upper and lower positions depicted in phantom in FIG. 6 as the lever member 202 pivots about the base edge 228 of a corresponding one of the U-shaped cutouts 220, 222.

In other words, as the accessible end 206 of the lever member 202 is moved upwardly or downwardly relative to the tube member 212, the lever member 202 pivots about the base edge 228 of a corresponding cutout 220 or 222 to one of the corresponding (upper or lower) positions depicted in phantom in FIG. 6. More specifically, when the accessible end 206 of the lever member 202 is moved downwardly to a lower position, the base edge 228 of the cutout 220 acts as a fulcrum about which the lever member 202 must pivot so that the upper end of the tappet rod 152 is lifted from its first, or medial, position to a raised position at which the internal valve 169 is opened. By comparison, when the accessible end 206 of the lever member 202 is moved upwardly to a raised position, the base edge 228 of the cutout 222 acts as a fulcrum about which the lever member 202 must pivot so that the upper end of the tappet rod 152 is depressed from its first, or medial, position to a lowered position at which the internal valve 169 is opened.

By virtue of the fact that the tube member 202 substantially surrounds the sides of the lever member 202, the tube member 202 provide s safety guard which reduces the likelihood that the lever member 202 will be inadvertently or accidentally actuated.

Figure 9:
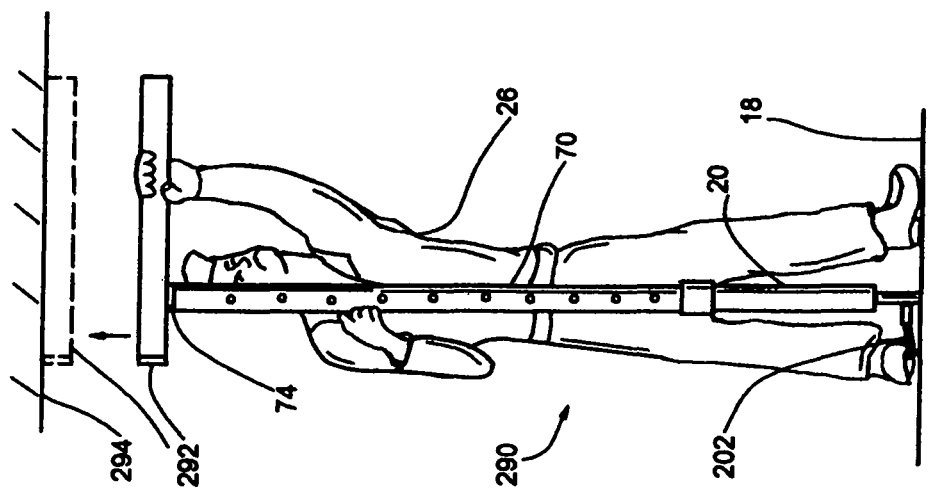
FIG. 9 is a perspective view of another embodiment of an apparatus shown being utilized in an inverted, or inner tube section-end down, orientation.

Because the accessible end 206 of the lever member 202 can be depressed to a lowered condition or raised to an elevated condition in order to open the valve 169, the post assembly 22 can be used in an upright orientation, as viewed in FIG. 1, at which lever member 202 can be readily depressed with the hand of a user 26 to open the internal valve 169 of the gas spring 130, or the post assembly 22 can be used in an inverted, or upside-down, orientation as viewed in FIG. 9 at which the lever member 202 can be depressed with the foot of a user 26 to open the valve 169 of the gas spring 130. Thus, the capacity of the internal valve 169 to be opened upon either the depression or raising of the lever member 202 enhances the versatility with which the post assembly 22 can be used and is advantageous in this respect.

To use the apparatus 20 to lift an item 42 (i.e. a light fixture) to a position adjacent the ceiling 43 and with reference to FIG. 7, the apparatus 20 is positioned beneath and in substantially vertical registry with the location at which the item 42 is desired to be positioned, and the gas spring 130 and post assembly 22 are arranged in a collapsed condition. Furthermore, the post assembly 22 is mounted within the extension tube 70, and the extension tube 70 is, in turn, mounted within the tripod-style base 24 so that when the post assembly 22 is subsequently moved to its extended condition, the support member 44, with the item 42 positioned thereon, is lifted to its desired elevated position adjacent the ceiling 43. With the item 42 positioned upon the support member 44, the accessible end 206 of the lever member 202 is then depressed (or raised) relative to the tube member 212 to thereby open the internal valve 169 so that the gas spring 130 begins to lift the item 42 upwardly. When the item 42 reaches the desired elevated position, the lever member 202 is released so that the internal valve 169 returns to a closed condition and the upward movement of the item 42 is halted. As long as the internal valve 169 remains closed, the piston 146 is maintained in a fixed position along the casing 138 of the gas spring 130 so that the item 42 is held in its desired elevated position.

With reference to FIG. 8, there is depicted an alternative embodiment of the invention, generally indicated 250, shown utilized with a step ladder 252 having a head step 254 which has either been constructed or modified to accept the extension tube 70 of the apparatus 250 directed downwardly therein. The apparatus 250 includes the post assembly 22 having inner and outer tube sections 30, 32 and the extension tube 70 whose construction is identical to the corresponding components of the apparatus 20 of FIG. 1. Meanwhile, the head step 254 of the ladder 252 has been constructed (or modified) so as to define a circular opening 256 disposed substantially centrally thereof and which has a diameter sized to closely accept the extension tube 70 directed downwardly through the opening 256. The apparatus 250 further includes a collar member 258 which is positioned about the extension tube 70 and which is securable along the length of the tube 70 by way of a set screw 260. By securing the collar member 258 about the extension tube 70 at a desired location therealong, and then directing the lower end of the extension tube 70 downwardly through the opening 256 of the head step 254, the post assembly 22 and extension tube 70 are supportable in an upright orientation by the ladder 254 as the underside of the collar member 258 rests upon the upper surface of the head step 254. It will be appreciated that in an instance in which an item (desired to be supported upon the support member 44) is to be worked upon in a room with a relatively high ceiling, the height of the ladder 252 compensates for the lack in length of the post assembly 22 and extension tube 70.

With reference to FIG. 9, there is depicted an apparatus, generally indicated 290, comprised of a post assembly 22 and extension tube 70 disposed in an inverted condition while being used to lift an item 292, such as a board, to a location adjacent a ceiling 294. That is to say that the post assembly 22 is oriented so that the inner tube section 30 rests upon the floor 18 and the end 74 of the extension tube 70 is directed upwardly. By resting the item 292 atop the end 74 of the extension tube 70 of the (FIG. 9) depicted apparatus 290 and then depressing the accessible end 206 of the lever member 202 downwardly, the post assembly 22 acts between the floor 18 and the extension tube 70 to raise the end 74 of the extension tube 70 (and the item 292 supported thereby) to a raised or elevated position adjacent the ceiling 294. It can be appreciated that by positioning the apparatus 290 so that its lever member 202 is capable of being depressed by the foot of the user 26, both hands of the user 26 are free to hold the apparatus 290 in the (FIG. 9) depicted upright condition or maintain the item 292 atop the end 74 of the extension tube 70.

Figure 10:
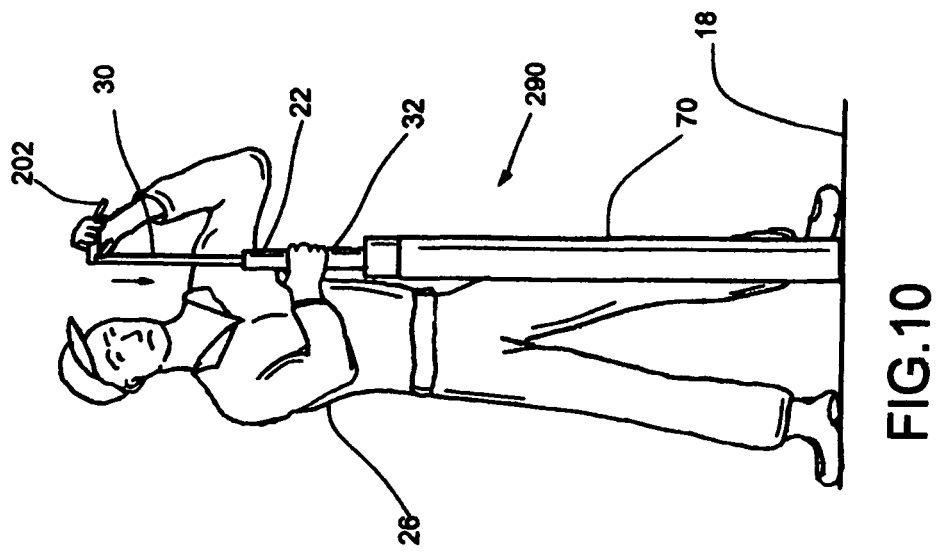
FIG. 10 is a perspective view of the FIG. 1 embodiment whose post assembly is shown being manually moved to a collapsed condition.

With reference to FIG. 10, there is depicted an apparatus, such as the FIG. 9 apparatus 290, whose post assembly 22 is returned from an extended condition toward a collapsed condition. To this end, the accessible end 206 of the lever member 202 is depressed or raised (i.e. moved out of its first, or medial, position depicted in solid lines in FIG. 6) so that the internal valve 169 (FIG. 5) is opened, and then the outer tube section 30 is forceably urged by the user 26 into and along the length of the outer tube section 32. As stated earlier, as long as the internal valve 169 is opened and a force (i.e. an axially-directed compression force) is exerted upon the opposite ends of the post assembly 22 which exceeds the lifting strength of the gas spring 130, the outer and inner tube sections 30, 32 can be returned to a collapsed condition and thus readied for a subsequent lifting operation.

With reference to FIGS. 11-19, there is illustrated an alternative embodiment, generally indicated 300, within which features of the present invention are incorporated. As does the embodiment 20 of FIGS. 1-7, the embodiment 300 includes a telescoping post assembly 322 comprising an inner tube 330, an outer tube 332 (having a series of openings 338 extending along the length thereof) and motive means, generally indicated 324 (e.g. in the form of a gas spring mounted internally of the inner tube 330) for moving the opposite upper and lower ends, indicated 333 and 335, respectively, of the post assembly 322 away from one another upon appropriate manipulation of an actuator mechanism 340 associated with the motive means 324. Moreover, the lower end of the outer tube 332 is anchored (i.e. pinned) in an end-to-end fashion to a telescoping extension tube assembly 302 which includes an inner tube 304 and an outer tube 306 which are arranged so as to permit the inner tube 304 to be slidably moved along the length of the outer tube 306 to alter the overall length (i.e. height) of the extension tube assembly 302. The inner and outer tubes 304 and 306 are each provided with a series of openings 342 or 344 defined along the sides thereof with which the inner and outer tubes 304 and 306 can be pinned together with a quick-release pin assembly 314, described herein.

An example of a gas spring capable of being used as the motive means, generally indicated 324, of the embodiment 300 is available from Bansbach Easylift of North America, Inc. under the trade designation EASYLIFT.

To fixedly connect the inner and outer tubes 304 and 306 together, the tubes 304, 306 are arranged so that a selected opening 342 of the inner tube 304 is aligned with a selected opening 334 of the outer tube 306, and then the pin assembly 314 is utilized to pin the inner and outer tubes 304 and 306 together by way of the aligned openings 342, 344. Meanwhile, the outer tube 332 of the telescoping post assembly 322 is pinned to the inner tube 304 of the extension tube assembly 302 with a quick-release pin assembly 315 which is similar in construction to the pin assembly 314. Both of the pin assemblies 314 and 315, along with the attending openings 338, 342, 344 provided along the length of the tubes 322, 304 and 306, facilitate a prompt adjustment in the overall length, or height, of the embodiment 300.

Figure 11:
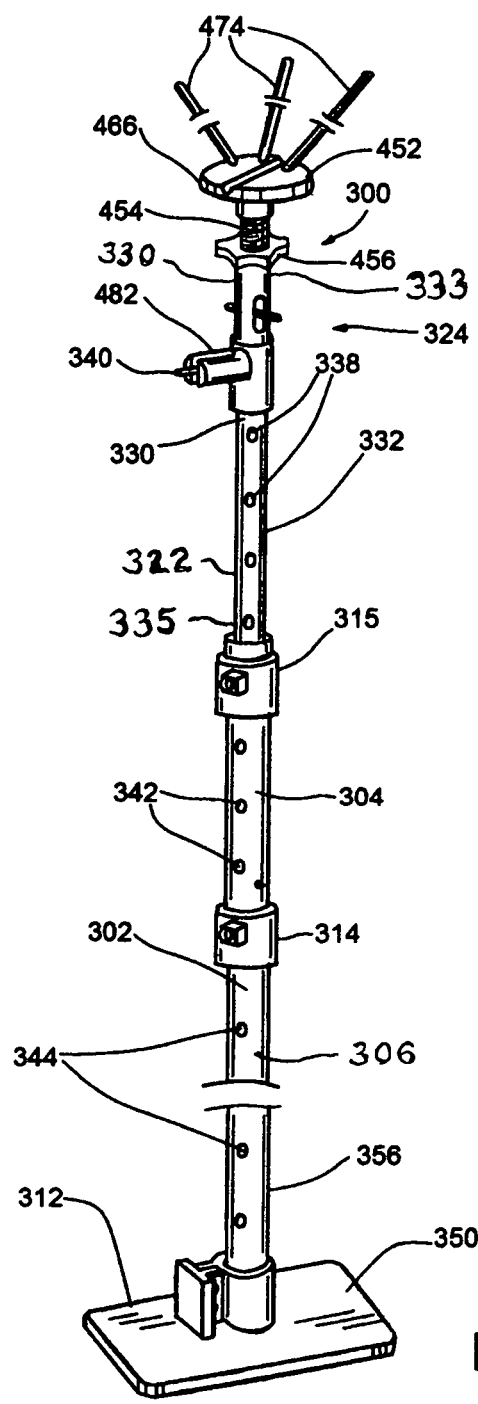
FIG. 11 is a perspective view of an alternative embodiment of an apparatus within which features of the present invention are embodied.
Figure 12:
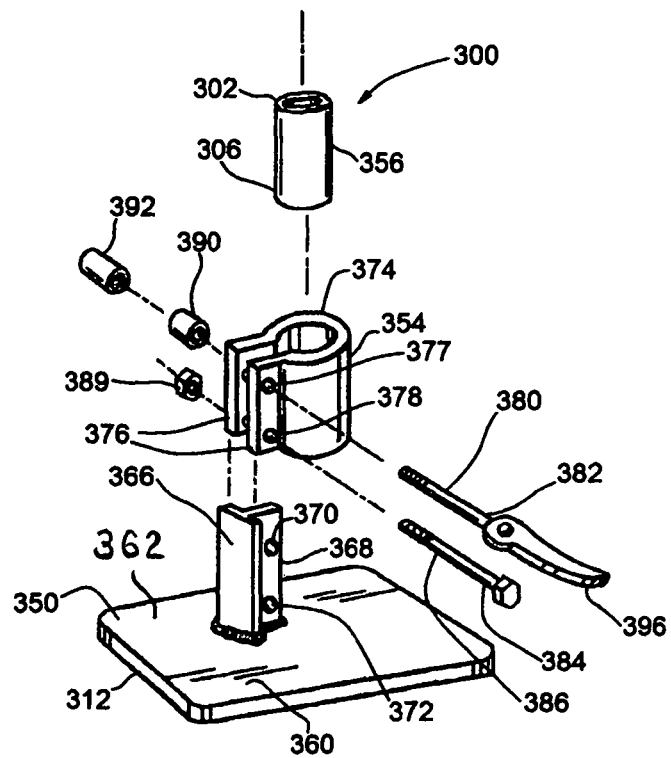
FIG. 12 is a perspective view of a fragment of the embodiment of FIG. 11, shown exploded.
Figure 13:
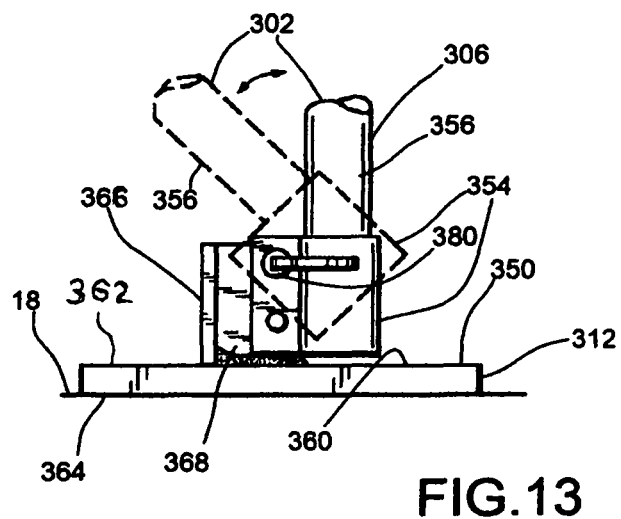
FIG. 13 is a side elevation view of the FIG. 12 fragment, as seen generally from the right in FIG. 12 and shown assembled.

As best shown in FIGS. 11-13, the embodiment 300 includes a base assembly 312 including a floor-engaging base 350 and a clamp assembly 354 for joining the extension tube assembly 302 to the floor-engaging base 350 in a manner which permits, when desired, the extension tube assembly 302 (and the post assembly 322 joined to the extension tube assembly 302) to be pivoted about the base 350 into and out of a vertically-oriented condition. To this end, the base 350 includes a relatively broad, flat plate 360 having an upper surface 362 and an opposite floor-engaging lower surface 364. A relatively short stud 366 having a substantially T-shaped cross section is joined (e.g. welded) to the upper surface 362 of the plate 360 so as to extend upwardly and at a substantially right angle to the upper surface 362, and the leg portion, indicated 368, of the T-shaped cross section of the stud 366 defines a pair of spaced, upper and lower openings 370, 372, respectively, which open laterally of the stud 366. Meanwhile, the clamp assembly 354 includes a body portion 374 which encircles the lower end, indicated 356, of the extension tube assembly 302 and a pair of flanges 376 having a pair of vertically-spaced, upper and lower through-openings 377, 378. The body portion 374 of the clamp assembly 254 is positioned about the extension tube assembly 302 so that the flanges 376 of the body portion 374 are disposed on opposite sides of the leg portion 368, and the through-openings 377, 378 of the flanges 376 are each aligned with a corresponding opening 370 or 372 provided in the leg portion 368. To secure the clamp assembly 254 to the stud 366, a first pin 380 having a shank 382 is directed endwise through the aligned openings 377 and 370, and a second pin 384 having a shank 386 is directed endwise through the aligned openings 378 and 372.

By positioning the lower end 356 of the extension tube assembly 302 within the body portion 374 of the clamp assembly 354 and then tightening the flanges 376 of the clamp assembly 354 together about the leg portion 368 of the post 366, the extension tube assembly 302 is firmly secured to the plate 360 so that when the plate 360 is positioned upon the underlying floor 18, the extension tube assembly 302 is supported in a substantially upright, or vertical, orientation from the floor 18.

The shank 382 of the first pin 380 is insertable through the aligned openings 377, 370 and possesses a threaded shank upon which a nut 390 is secured and about which a cap 392 is positionable, and the shank 386 of the second pin 384 possesses a threaded end upon which a nut 389 is securable. Meanwhile, an over center lever 396 is associated with the head end of the shank 382 of the first pin 380 so that pivotal movement of the lever 396 between a position at which the longitudinal axis of the lever 396 is substantially aligned with the shank 386 and another position at which the longitudinal axis of the lever 396 is arranged substantially normal to the shank 382 for altering the clamp body 374 between a first condition at which the flanges 376 are loosely positioned about the leg portion 368 of the stud 366 (and at which the lower end 356 of the extension tube assembly 302 can be moved endwise into or out of the body portion 374 of the clamp assembly 374) and a second condition at which the flanges 376 are tightened together about the leg portion 368 (and at which condition the lower end 356 of the extension tube assembly 302 is tightly clamped within the body portion 374 of the clamp assembly 354).

It is also a feature of the embodiment 300 that its clamp assembly 354 permits the extension tube assembly 302 (and the post assembly 322 supported thereby) to be pivoted relative to the plate 360 of the base assembly 302 to alter the angular relationship between the extension tube assembly 302 and the plate 360. More specifically and in order to permit the extension tube assembly 302 to be pivoted relative to the plate 360, the nut 389 is removed from the shank 386 of the second pin 384, and then the second pin 384 is withdrawn from the aligned openings 378, 372, leaving the body portion 374 pinned to the post 366 by way of the first pin 380. With the second pin 384 thus removed from the clamp assembly 354, the extension tube assembly 302 and post assembly 322 can be pivoted (i.e. manually urged) about the first pin 380 and relative to the plate 360 to alter, when desired, the angular relationship between the extension tube assembly 302 and the plate 360. It follows that the over center lever 396 must be manipulated, as necessary, between tightened and loosened conditions to permit the aforedescribed pivoting of the extension tube assembly 302 and post assembly 322 relative to the plate 360.

It has been found that the aforedescribed floor-engaging base 350 provides a relatively stable support for the embodiment 300.

Figure 14:
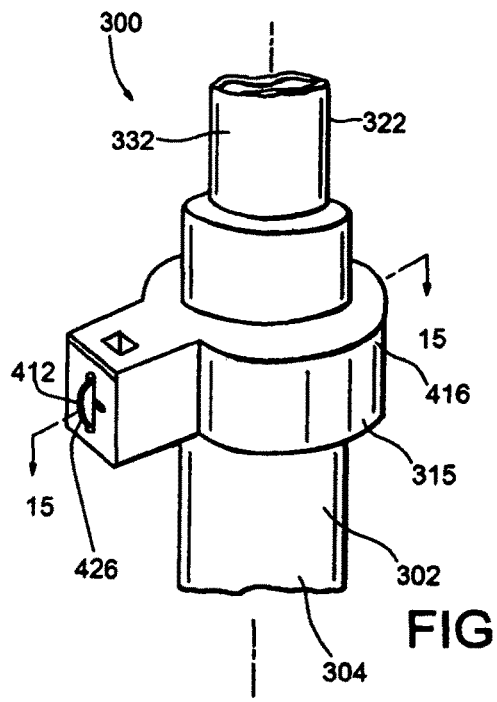
FIG. 14 is a perspective view of another fragment of the embodiment of FIG. 11.
Figure 15:
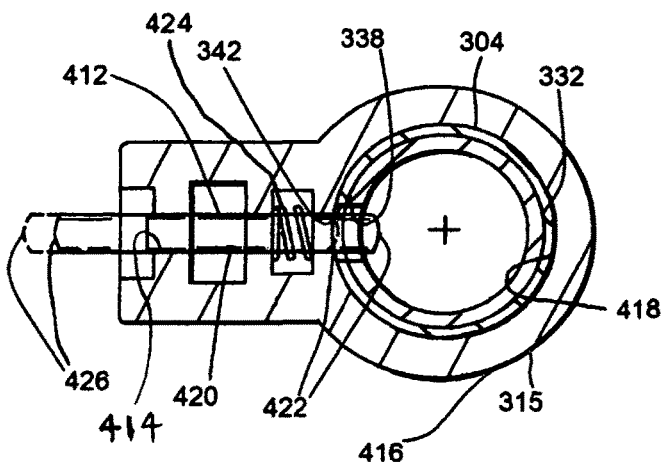
FIG. 15 is a cross-sectional view taken about along line 15-15 of FIG. 14.

With reference to FIGS. 11, 14 and 15, the telescoping post assembly 322 is connected to the extension tube assembly 304 by way of a quick-release pin assembly 315, introduced earlier, and the inner and outer tubes 304, 306 of the extension tube assembly 302 are connected to one another by way of a quick-release pin assembly 314. By positioning the outer tube 332 (of the post assembly 322) along the length of the inner tube 304 (of the extension tube assembly 302) so that one through opening 338 of the outer tube 332 is aligned with a selected one of the series of openings 342 of the inner tube 304, the pin assembly 315 is used to pin the tubes 332 and 304 together by way of the aligned openings 338 and 342. Similarly, by positioning the inner tube 304 along the length of the outer tube 306 of the extension tube assembly 302 so that one of the openings 342 thereat is aligned with a selected opening 344 of the outer tube 306, the pin assembly 314 is used to pin the tubes 304, 306 together by way of the aligned openings 342 and 344. It follows that the extension tube assembly 302 provides a convenient means by which the overall length of the embodiment 300 can be altered.

As exemplified by the pin assembly 315 of FIGS. 14 and 15, each pin assembly 314 and 315 includes a collar-providing body 416 and a spring-biased pin 412 which is mounted for movement axially through an opening 414 provided within the collar-providing body 416. The body 416 also include a vertically-extending opening 418 which is sized to closely accept a corresponding tube (e.g. the inner tube 304 of the extension tube assembly 302) directed endwise through the opening 418. Meanwhile, the pin 412 has a shank 420 having an end 422 which is capable of movement relative to the body 416 between a retracted condition, as depicted in phantom in FIG. 15, at which the pin end 422 is withdrawn from the aligned openings 338, 342 provided in the outer tube 332 of the post assembly 322 and the inner tube 304 of the extension tube assembly 302 and an extended condition, as depicted in solid lines in FIG. 15, at which the pin end 422 is accepted by the aligned openings 338, 342 so as to connect (i.e. pin) the inner tube 304 and the outer tube 332 together.

Mounted within the collar-providing body 416 is a compression spring 424 for acting between the pin 412 and the body 416 for biasing the pin end 422 from the FIG. 15 retracted (phantom line) condition toward the FIG. 15 extended (solid-line) condition. At the end of the pin 412 opposite the end 422 thereof, there is provided a thumb-accepting ring 426 with which the pin 412 is capable of being manually moved against the biasing force of the spring 424 from the FIG. 15 extended condition toward the FIG. 15 retracted condition.

Preferably, the opening 414 (or, more specifically, the walls thereof) of the collar-providing body 416 opposite the pin end 422 can be appropriately configured, or shaped, so that by pulling the pin 412 (by way of the ring 426) from its FIG. 15 extended condition to its FIG. 15 retracted condition and then rotating the ring 426 about the longitudinal axis of the pin 412 through about ninety degrees of rotation and then releasing the ring 426, the pin 412 is prevented from returning to the FIG. 15 extended condition under the influence of the spring 424. Upon arranging the pin 412 in such a position, the pin 412 is held in its retracted condition as the ring 426 bears against an appropriately-shaped portion of the opening 414 of the collar-providing body 416. Thereafter and to permit the pin 412 to return to its FIG. 15 extended position, the ring 426 is simply grasped and rotated about the longitudinal axis of the pin 412 through about ninety degrees of rotation and then released so that the pin end 422 is permitted to move toward its FIG. 15 extended condition by way of the spring 424.

Figure 16:
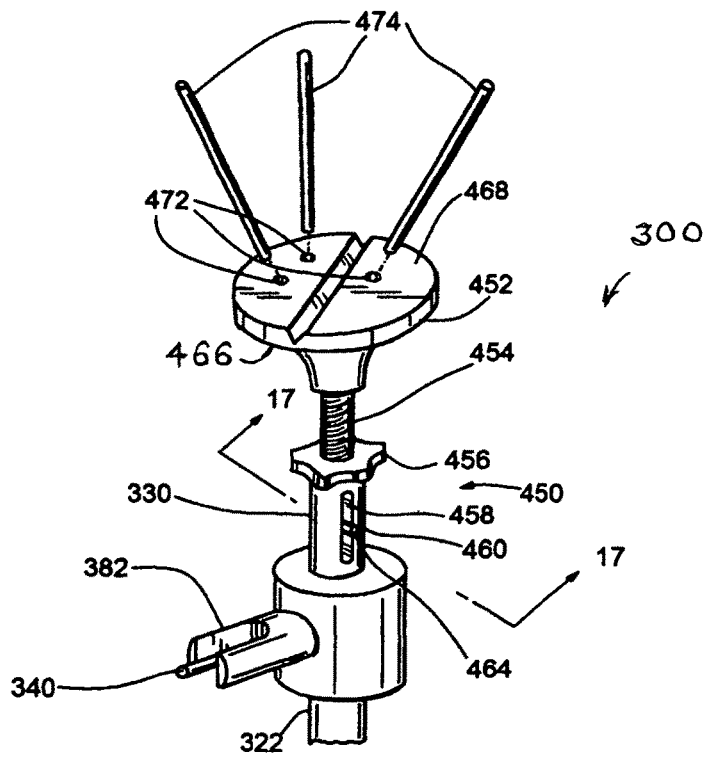
FIG. 16 is a perspective view of still another fragment of the embodiment of FIG. 11, shown with its plurality of finger-providing rods removed from the remainder of the embodiment.

With reference to FIGS. 16-18, the embodiment 300 also includes means, generally indicated 450, with which an operator can make small (e.g. fine) adjustments to the length of the post assembly 322 (and consequently, to the length of the embodiment 300) after, for example, the operator has made larger scale adjustments to the length of the post assembly 322 by way of the motive means 324. To this end, there is provided a support assembly 452 (upon which an item is positionable) having an externally-threaded shank 454 which extends downwardly into the upper end of the inner tube 330 of the telescoping post assembly 322. Meanwhile, there is threaded about the shank 454 a manually-rotatable nut 456 which rests atop the upper end of the inner tube 330 so that by rotating the nut 456 in one rotational direction relative to the inner tube 330, the support assembly 452 is moved upwardly relative to the inner tube 330 and by rotating the nut 456 in the opposite rotational direction about the inner tube 330, the support assembly 452 is moved downwardly relative to the inner tube 330.

To prevent the support assembly 452 from rotating within the inner tube 330 as the nut 456 is rotated, there is provided a pair of aligned slots 458 which extend axially along the inner tube 330 adjacent the upper end thereof and a through-opening 459 (FIG. 17) which extends through the base of the threaded shank 454. A pin 460 is directed through and secured within the through-opening 459 so that the opposite ends, indicated 462, 464 in FIG. 17, of the pin 460 protrude through the slots 458. It follows that any rotation of the shank 454 relative to the inner tube 330 is prevented by the cooperation between the ends 462, 464 of the pin 460 and the edges of the slots through which the pin ends 462, 464 protrude. In other words, the side edges of the slots 458 provide surfaces against which the ends 462, 464 of the pins 460 abut (and come to a halt) when the threaded shank 454 is ever rotated relative to the inner tube 330 within which the shank 454 is positioned.

With reference still to FIGS. 16-18, the support assembly 452 includes a disc-shaped portion 466 which is securely attached (i.e. fixed) atop the threaded shank 454 and which defines an upwardly-facing circular support surface 468. An upwardly-opening V-shaped groove 470 is formed across the support surface 468, and a plurality of (e.g. three or more) circular recesses 472 are formed within and open out of the support surface 468 at regularly-spaced intervals adjacent the perimeter of the support surface 468. Each circular recess 472 is adapted to accept one end of a threaded rod 474 directed endwise therein so that collectively, the rods 474 provide a plurality of (e.g. three) load-engaging fingers upon which various classes of loads can be positioned. Preferably, the rods 474 are constructed of a hard, resilient plastic material capable of effectively grasping an object wedged therebetween, but other materials can be used.

By way of example, there is depicted in FIG. 17 a load in the form of a light globe 476 of semispherical shape which is capable of being wedged and thus stably supported between the finger-providing rods 474 as the embodiment 300 is lengthened. Meanwhile and if desired, the rods 474 can be readily removed (i.e. lifted endwise) from the recesses 472 provided within the support surface 468 of the disc-shaped portion 466 to expose the support surface 468 for load-engaging purposes. For example, there is depicted in FIG. 18, a load in the form of a piece of cylindrical pipe or conduit 478 shown superposed above the V-shaped groove 470 of the support surface 468. During a load-lifting operation, the piece of pipe or conduit 478 rests stably along the groove 470.

It follows from the foregoing that the motive means 324 of the apparatus embodiment 300 provides an operator with the capability of making large scale, or gross, adjustments in the overall length, or height, of the embodiment 300 while the adjustment means 450 provides an operator with the capability of making smaller scale, or fine, adjustments in the overall length, or height, of the embodiment 300. Meanwhile, the support apparatus 452—with its removable rods 474 and V-shaped groove 470—permit the embodiment 300 to be readily modified, or adapted, to support loads of differing forms. Accordingly, the support apparatus 452 of the embodiment 300 is advantageous in this respect.

Another advantage provided by the support apparatus 452 relates to the capacity of the apparatus embodiment 300 to support an overhead load which is substantially greater than the threshold lifting capacity provided by the gas spring of the motive means 324. In other words, once the embodiment 300 is positioned so as to extend between the floor and an overhead load, the adjustment means 450 can be manipulated (by appropriate rotation of the nut 456) so that additional load-bearing forces can be exerted upwardly against the overhead load. In this connection and as long at the actuator mechanism 340 of the motive means 340 is not actuated, the capacity of the motive means 324 to support a load is significantly greater than the threshold lifting capacity of the gas spring of the motive means 324. Thus, the embodiment 300 can be positioned between the underlying floor 18 and an overhead load so that the disc-shaped portion 466 of the adjustment means 450 is situated adjacent or in contact with the overhead load, and then the adjustment means 450 can be utilized to move the disc-shaped portion 466 thereof into engagement with and apply strong upwardly-directed forces to the overhead load for purposes of supporting the overhead load.

In addition and with reference to FIG. 18, the disposition of the actuator mechanism 340 of the motive means 324 relative to the telescoping post assembly 322 enables an operator to both manually stabilize the embodiment 300 and manipulate the actuator mechanism 340 with a single hand, indicated 480 in FIG. 18, of the operator. For example, there is shown in FIG. 18 an exemplary positioning of the user's hand 480 about the pipe-providing section, indicated 382, which surrounds the accessible portion of the actuator mechanism 340 so that the thumb of the user's hand 480 is free to manipulate the actuator mechanism 340 upwardly or downwardly. The advantage of such a feature can be readily appreciated when considering the possibility that if only one hand of the operator is required to both steady the depicted embodiment 300 of the apparatus and manipulate the actuator mechanism 340 during a load-lifting operation, the other hand of the operator is free for other purposes, such as steadying the load borne atop the embodiment 300.

Figure 19:
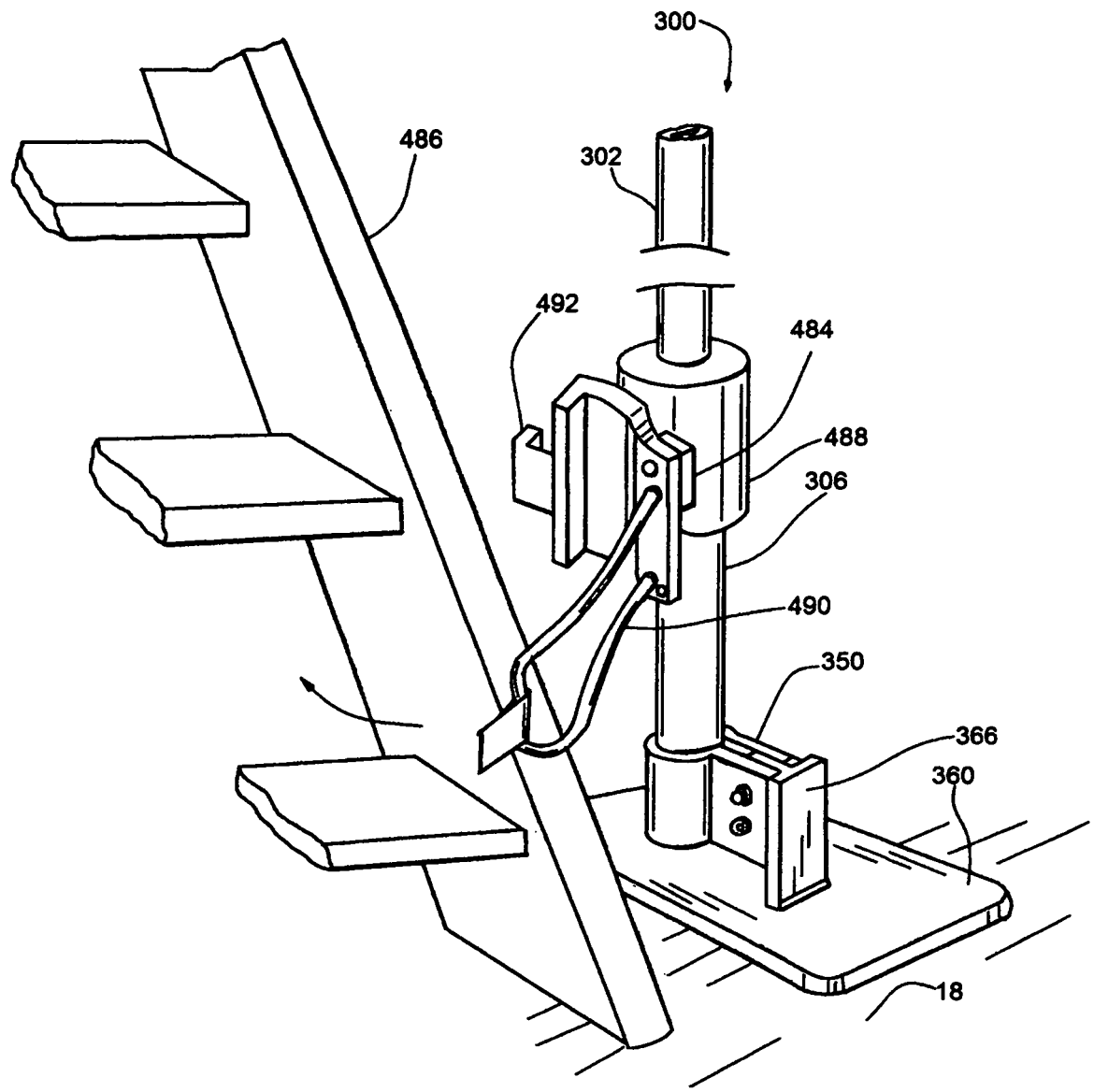
FIG. 19 is a perspective view of yet another fragment of the embodiment of FIG. 11 to which a bracket has been attached for securement of the embodiment to a step ladder disposed adjacent the embodiment.

It will be understood that numerous modifications and substitutions can be had to the aforedescribed embodiments 20 and 300 without departing from the spirit of the invention. For example, there is depicted in FIG. 19 the lower portion of the apparatus embodiment 300 about which a supplemental bracket 384 is secured for purposes of securing the apparatus embodiment 300 to an adjacent item for the purpose of further stabilizing the embodiment 300 for a load-lifting operation. Such adjacent items can be provided by the frame (i.e. a leg) of a step ladder (such as the step ladder 386 of FIG. 19) or a man lift or a scissor lift. For securement of the embodiment 300 to the adjacent item, the supplemental bracket 384 includes a collar portion 388 which is positionable in a secured condition about the outer tube 306 of the extension tube assembly 302 adjacent the floor-engaging base 350 thereof, and an elastomeric strap 390 is joined to the collar portion 388 enabling the collar portion 388 to be wrapped about and tied to the adjacent item by way of a hook 392 associated with the collar portion 388.

Furthermore and although the motive means 38 of the aforedescribed apparatus embodiment 20 of FIGS. 1-7 has been shown and described as being in the form of a gas spring 130, the motive means 38 can take an alternative form. For example, the motive means of an apparatus embodying features of the present invention could be provided by a battery-powered linear actuator for moving the two opposite ends of a telescoping post assembly toward or away from one another. Within such an embodiment, a manually-operable actuator mechanism could be provided by the switching mechanism of a two position switch.

Further still, an actuator mechanism suitable for use with an apparatus of the present invention need not be manually manipulated at the telescoping tube assembly of the apparatus. Instead, such an actuator mechanism could be manipulated remotely (e.g. with appropriate electronic hardware) of the telescoping tube assembly. Accordingly, the aforedescribed embodiments are intended for the purpose of illustration and not as limitation.

The invention claimed is:

1. An apparatus for lifting or supporting an item in an elevated condition above a floor or underlying support surface, said apparatus comprising:
   an elongated telescoping post assembly defining two opposite end sections and having an inner tube section and an outer tube section wherein the inner tube section provides one end section of the two opposite end sections of the post assembly and the outer tube section provides the other end section of the two opposite end sections of the post assembly;
   motive means for moving the inner and outer tube sections relative to one another to alter the distance between the two opposite end sections of the post assembly;
   a manually-operable actuator mechanism associated with the motive means and which is movable between a first condition and a second condition so that movement of the actuator mechanism from the first condition to the second condition effects the movement of the two opposite end sections of the post assembly away from one another
   so that by positioning the telescoping post assembly between the support surface and the item to be lifted and then moving the actuator mechanism from the first condition to the second condition effects the lifting of the item from the floor or underlying support surface; and
   a stand assembly for supporting the elongated post assembly in an upright orientation and wherein the stand assembly is adapted to accommodate an adjustment in the angular relationship between the post assembly and the floor or underlying support surface, wherein the stand assembly includes a floor-engaging base and a clamp assembly for joining the post assembly to the floor-engaging base, the clamp assembly including a body portion for substantially encircling the post assembly and a pair of flanges joined to the body portion and having a pair of substantially flat surfaces which oppose one another and are moveable toward and away from one another between one condition at which the body portion is loosely positioned about the post assembly and another condition at which the body portion is tightly positioned about the post portion, and the substantially flat surfaces of the pair of flanges define aligned through-openings therein, and the floor-engaging base includes a flat plate having a lower surface for engaging the floor or underlying support surface, an opposite upper surface and a stud which is attached to the flat plate so as to extend upwardly from the upper surface thereof, and the stud has two substantially flat vertically-oriented opposite side surfaces and defines a through-opening which extends between the opposite side surfaces thereof; and the flanges of the clamping assembly are arranged outboard and on opposite sides of the stud so that each of the substantially flat surfaces of the flanges face a corresponding substantially flat vertically-oriented side surface of the stud and the through-openings of the flanges are aligned with the through-opening defined in the stud; and means for pivotally securing the elongated post assembly to the floor-engaging base to accommodate a pivotal adjustment of the elongated post assembly relative to the floor-engaging base to any angular relationship therebetween through a range of ninety degrees of movement, wherein the means for pivotally securing includes an elongated shank having two opposite ends and which extends through the aligned through-openings of the flanges and the stud and further includes a nut which is positioned about the elongated shank of one of the ends of the elongated shank; and means for securing the elongated post assembly to the floor-engaging base in a fixed relationship therewith and at any angular relationship therebetween through ninety degrees of movement wherein said means for securing includes an over-center latch associated with the end of the elongated shank opposite the end thereof about which the nut is positioned so that when the elongated shank is positioned through the aligned through-openings of the flanges and the stud, the nut which is positioned about one end of the elongated shank and the over-center latch are disposed outboard of the flanges of the clamp assembly, and the over-center latch is manipulable relative to the elongated shank between a first condition at which the flanges are loosely positioned about the stud to accommodate a pivotal movement of the clamp assembly relative to the floor-engaging base about the elongated shank and a second condition at which the substantially flat surfaces of the flanges and the substantially flat vertically-disposed surfaces of the stud are tightened against one another in frictionally gripping engagement to thereby clamp the elongated post assembly within the body portion of the clamp assembly and to thereby secure the elongated post assembly to the stand assembly in the fixed relationship therewith as aforesaid.

2. The apparatus as defined in claim 1 wherein the motive means includes a gas spring.

3. The apparatus as defined in claim 2 wherein the gas spring includes two opposite ends which are movable toward and away from one another and which are fixedly secured between the inner and outer tube sections so that movement of the two opposite ends of the gas spring away from one another moves the opposite end sections of the post assembly away from one another.

4. The apparatus as defined in claim 2 wherein the gas spring includes an elongated outer casing having an interior and an internal piston which is mounted within the casing for sliding movement along the length of the casing and for separating the interior of the casing into two chambers, and the gas spring further includes a valve which is associated with the piston and which is movable with respect to the piston between an open condition at which the two chambers of the casing interior communicate with one another and a closed condition at which the two chambers of the casing interior are prevented from communicating with one another, and the manually-operable actuator mechanism is connected to the valve of the gas spring so that movement of the actuator mechanism from the first condition to the second condition moves the valve from the closed condition to the opened condition.

5. The apparatus as defined in claim 4 wherein the actuator mechanism is in the form of a lever member having an effort arm portion which is connected to the piston of the gas spring and a response arm portion, and the apparatus further includes a member which provides a fulcrum about which the lever member is adapted to pivot so that upon movement of the actuator mechanism from the first condition to the second condition pivots the lever member about the fulcrum-providing member for moving the valve of the gas spring from the closed condition to the opened condition.

6. The apparatus as defined in claim 5 wherein the fulcrum-providing member is in the form of a tube having an interior through which the lever member extends, and the tube defines a cutout along one side thereof, and the cutout has a surface which provides the fulcrum of the fulcrum-providing member.

7. The apparatus as defined in claim 1 further including an extension tube which is supported within the stand assembly and the elongated post assembly is, in turn, securable to the extension tube in substantially an end-to-end relationship therewith, and the apparatus further includes a pin assembly including a spring-biased pin for pinning the outer tube of the post assembly to the extension tube.

8. The apparatus as defined in claim 1 further including a support member associated with the inner tube section of the post assembly upon which the item to be lifted can be positioned, and the apparatus further including length-altering mechanisms interposed between the inner tube section of the post assembly and which includes an externally-threaded shank and a nut which is threaded about the threaded shank and which cooperates with the inner tube section so that rotation of the nut in one rotational direction about the externally-threaded shank and relative to the inner tube section moves the support member axially away from the inner tube section and rotation of the nut in the opposite rotational direction about the externally-threaded shank and relative to the inner tube section moves the support member axially toward the inner tube section.

9. The apparatus as defined in claim 1 further including a support member associated with the inner tube section of the post assembly upon which the item to be lifted can be positioned wherein the support member includes a disc-shaped portion having an upper surface, and the disc-shaped portion defines a V-shaped groove which extends across the upper surface and a plurality of recesses which open out of the upper surface, and the apparatus further includes a plurality of rods which can each be inserted endwise into a corresponding recess defined in the upper surface so that when accepted by the recesses, the rods provide a plurality of load-engaging fingers between which a load desired to be lifted with the apparatus can be wedged for a load-lifting operation.

10. An apparatus for lifting or supporting an item in an elevated condition above a floor or underlying support surface, said apparatus comprising:

an elongated telescoping post assembly defining two opposite ends and having an inner tube section and an outer tube section wherein the inner tube section provides one end of the two opposite ends of the post assembly and the outer tube section provides the other end of the two opposite ends of the post assembly;

a gas spring for moving the inner and outer tube sections relative to one another to alter the distance between the two opposite ends of the post assembly;

a manually-operable actuator mechanism which is associated with the gas spring and which is movable relative to the post assembly between a first condition and a second condition so that movement of the actuator mechanism from the first condition to the second condition effects the movement of the two opposite ends of the post assembly away from one another so that by positioning the telescoping post assembly between the support surface and the item to be lifted so that upon movement of the two opposite ends of the post assembly away from one another effects the lifting of the item from the support surface and then moving the actuator mechanism from the first condition to the second condition effects the lifting of the item from the support surface; and a stand assembly for supporting the elongated post assembly in an upright orientation and wherein the stand assembly is adapted to accommodate an adjustment in the angular relationship between the post assembly and the floor or underlying support surface, wherein the stand assembly includes a floor-engaging base and a clamp assembly for joining the post assembly to the floor-engaging base, the clamp assembly including a body portion for substantially encircling the post assembly and a pair of flanges joined to the body portion and having a pair of substantially flat surfaces which oppose one another and are movable toward and away from one another between one condition at which the body portion is loosely positioned about the post assembly and another condition at which the clamp assembly is tightly positioned about the post assembly, and the substantially flat surfaces of the pair of flanges define aligned through-openings therein, and the floor-engaging base includes a flat plate having a lower surface for engaging the floor or underlying support surface, an opposite upper surface and a stud which is attached to the flat plate so as to extend upwardly from the upper surface thereof, and the stud has two substantially flat vertically-oriented opposite side surfaces and defines a through-opening which extends between the opposite side surfaces thereof; and the flanges of the clamping assembly are arranged outboard and on opposite sides of the stud so that each of the substantially flat surfaces of the flanges face a corresponding substantially flat vertically-oriented side surface of the stud and the aligned through-openings of the flanges are aligned with the through-opening defined in the stud; and means for pivotally securing the elongated post assembly to the floor-engaging base to accommodate a pivotal adjustment of the elongated post assembly relative to the floor-engaging base to any angular relationship therebetween through a range of ninety degrees of movement, wherein the means for pivotally securing includes an elongated shank having two opposite ends and which extends through the aligned through-openings of the flanges and the stud and further includes a nut which is positioned about the elongated shank of one of the ends of the elongated shank; and means for releasably securing the elongated post assembly to the floor-engaging base in a fixed relationship relative thereto and at any angular relationship therebetween through ninety degrees of movement wherein said means for releasably securing includes an over-center latch associated with the end of the elongated shank opposite the end thereof about which the nut is positioned so that when the elongated shank is positioned through the aligned through-openings of the flanges and the stud, the nut which is positioned about one end of the elongated shank and the over-center latch are disposed outboard of the flanges of the clamp assembly, and the over-center latch is manipulable relative to the elongated shank between a first condition at which the flanges are loosely positioned about the stud to accommodate a pivotal movement of the clamp assembly relative to the floor-engaging base about the elongated shank and a second condition at which the substantially flat surfaces of the flanges and the substantially flat vertically-disposed surfaces of the stud are tightened against one another in frictionally gripping engagement to thereby clamp the elongated post assembly within the body portion of the clamp assembly and to thereby secure the elongated post assembly to the stand assembly in the fixed relationship therewith as aforesaid.

11. The apparatus as defined in claim 10 wherein the gas spring includes two opposite ends which are movable toward and away from one another and which are fixedly secured between the inner and outer tube sections so that movement of the two opposite ends of the gas spring away from one another moves the opposite end sections of the post assembly away from one another.

12. The apparatus as defined in claim 10 wherein the gas spring includes an elongated outer casing having an interior and an internal piston which is mounted within the casing for sliding movement along the length of the casing and for separating the interior of the casing into two chambers, and the gas spring further includes a valve which is associated with the piston and which is movable with respect to the piston between an open condition at which the two chambers of the casing interior communicate with one another and a closed condition at which the two chambers of the casing interior are prevented from communicating with one another, and the manually-operable actuator mechanism is connected to the valve of the gas spring so that movement of the actuator mechanism from the first condition to the second condition moves the valve from the closed condition to the opened condition.

13. The apparatus as defined in claim 12 wherein the actuator mechanism is in the form of a lever member having an effort arm portion which is connected to the piston of the gas spring and a response arm portion, and the apparatus further includes a member which provides a fulcrum about which the lever member is adapted to pivot so that upon movement of the actuator mechanism from the first condition to the second condition pivots the lever member about the fulcrum-providing member for moving the valve of the gas spring from the closed condition to the opened condition.

14. The apparatus as defined in claim 13 wherein the fulcrum-providing member is in the form of a tube having an interior through which the lever member extends, and the tube defines a cutout along one side thereof, and the cutout has a surface which provides the fulcrum of the fulcrum-providing member.

15. The apparatus as defined in claim 10 further including an extension tube which is supported within the stand assembly and the elongated post assembly is, in turn, securable to the extension tube in substantially an end-to-end relationship therewith, and the apparatus further includes a pin assembly including a spring-biased pin for pinning the outer tube of the post assembly to the extension tube.

16. The apparatus as defined in claim 15 wherein the outer tube section is arranged within the extension tube for sliding movement therealong, and the pin assembly permits the outer tube section of the post assembly to be releasably secured at alternative locations along the length of the extension tube.

17. The apparatus as defined in claim 10 further including a support member associated with the inner tube section of the post assembly upon which the item to be lifted can be positioned wherein the support member includes a disc-shaped portion having an upper surface, and the disc-shaped portion defines a V-shaped groove which extends across the upper surface and a plurality of recesses which open out of the upper surface, and the apparatus further includes
    a plurality of rods which can each be inserted endwise into a corresponding recess defined in the upper surface so that when accepted by the recesses, the rods provide a plurality of load-engaging fingers between which a load desired to be lifted with the apparatus can be wedged for a load-lifting operation.

\* \* \* \* \*